United States Patent Office 2,892,875
Patented June 30, 1959

2,892,875

MANUFACTURE OF CARBON TETRACHLORIDE

Frederick E. Kung, Akron, Ohio, assignor to Columbia-Southern Chemical Corporation, Allegheny County, Pa., a corporation of Delaware No Drawing. Application November 15, 1956
Serial No. 622,284

9 Claims. (Cl. 260—664)

The present invention involves a novel process for the manufacture of carbon tetrachloride and more particularly has relation to obtaining carbon tetrachloride by disproportionation of phosgene.

Carbon tetrachloride is prepared by several recognized methods. One such method chlorinates methane or other hydrocarbon with elemental chlorine. A necessary by-product of this chlorination is hydrogen chloride. Not infrequently, hydrogen chloride (or hydrochloric acid) is in oversupply and commands no market, e.g. it is for practical purposes a waste product. Hence, approximately half the chlorine consumed in methane chlorination is for production of a relatively unimportant by-product.

According to the process hereof, carbon tetrachloride may be prepared without formation of by-product hydrogen chloride (or hydrochloric acid). It now has been found that under special conditions, phosgene may be disproportionated to carbon tetrachloride in good yields. This disproportionation apparently proceeds in accordance with the overall equation:

$$2COCl_2 \rightarrow CCl_4 + CO_2$$

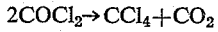

The theoretical possibility of preparing carbon tetrachloride from phosgene in accordance with the reaction represented by the above equation has heretofore been considered. Fink and Bonilla, Journal of Physical Chemistry, volume 37 pages 1135–1167 (1933), made a rather definitive study, and conducted numerous experiments in an effort to perform the hypothesized reaction. They failed to produce carbon tetrachloride in any experiment, see page 1155.

U.S. Letters Patent 808,100 to Machalske describes decomposition of phosgene to carbon tetrachloride in contact with bone-black, coke, or pumice. Fink and Bonilla, however, failed to disproportionate phosgene using various varieties of carbon (see page 1155). On page 1152, Fink and Bonilla present thermodynamic data indicating the hypothesized reaction is endothermic. Machalske reports his reaction as exothermic. It thus appears that Machalske is in error in ascribing the decomposition of phosgene as the reaction mechanism by which he reportedly obtained carbon tetrachloride.

In accordance with this invention, a novel process is provided whereby phosgene is disproportionated to carbon tetrachloride in good yields. Now it has been discovered that at temperatures above 200° C., superatmospheric pressures upwards of 10 atmospheres and in the presence of a Friedel-Crafts chloride catalyst, especially ferric chloride or aluminum chloride, substantial conversion of phosgene to carbon tetrachloride occurs. Conversions of the magnitude of 80 percent and better are realized.

It is by recourse to these conditions of pressure, temperature and catalyst in combination that disproportionation of phosgene to carbon tetrachloride in insignificant yields is realized. In the absence of a Friedel-Crafts chloride catalyst such as ferric chloride or aluminum chloride, prosgene disproportionation is not observed despite temperatures and pressure which are suitable with catalyst. And unless superatmospheric pressures above 10 atmospheres are employed, formation of carbon tetrachloride has not been observed, even with suitable catalyst and temperatures above 200° C.

In a typical performance of this invention, phosgene and a Friedel-Crafts chloride catalyst, preferably ferric chloride or aluminum chloride, are charged to a reactor designed to withstand elevated pressures, e.g. an autoclave. The ratio of phosgene and catalyst is capable of considerable latitude. Best conversions are realized with 0.1 to 5.0 moles of catalyst per mole of phosgene.

With the reactor sealed, the contents are heated to above 200° C., preferably to from 300° C. to 600° C., and subjected to at least 10 atmospheres pressure. Even higher temperatures, e.g. up to decomposition temperature of carbon tetrachloride, are permissible. Most appropriately, 30 to 500 atmospheres' pressure are generated, although it is possible to use substantially greater pressures such as 2500 atmospheres, or greater, say 5000 atmospheres. Economic considerations such as the cost of special equipment to withstand pressure above 2500 atmospheres and temperatures in excess of 1000° C. make the use of more severe temperature and pressure conditions generally ill advised.

Disproportionation of phosgene in performance of this invention proceeds rather slowly; hence, the charge is favorably maintained at the requisite reaction conditions for more than one hour. Shorter reaction periods, while yielding carbon tetrachloride, are not regarded as practical. Similarly, more than 24 hours unduly prolongs operation of the process and is not especially favored. As will hereinafter be discussed, it is often practical to restrict the degree of conversion by limiting the reaction period.

Practice of this invention readily lends itself to the sequential formation of phosgene followed by disproportionation to carbon tetrachloride. It is therefore to be understood phosgene per se need not be charged to the reaction. Instead, phosgene may be formed in situ by reaction of chlorine and carbon monoxide in the reactor. This formation of phosgene proceeds in quantitative yields at below room temperature with aluminum chloride catalysis. Accordingly, a charge of chlorine, carbon monoxide and aluminum chloride may first be maintained at below room temperature to form phosgene whereafter pressures and temperatures may be raised and the phosgene disproportionated.

Phosgene is commercially manufactured by reaction of elemental chlorine and carbon monoxide in accordance with the equation:

$$CO + Cl_2 \rightarrow 2COCl_2$$

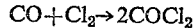

Consequently, the present invention may be viewed as a means for the manufacture of carbon tetrachloride from carbon monoxide and elemental chlorine with carbon dioxide as the sole by-product. Even carbon dioxide may be reduced to carbon monoxide by well-recognized procedures and recycled for consumption in the preparation of phosgene. The Friedel-Crafts chloride catalyst is recoverable. Hence, the present discovery offers an efficient means for manufacturing carbon tetrachloride from carbon monoxide and elemental chlorine.

The following examples illustrate the manner in which the present invention may be performed:

EXAMPLE I

A series of individual experiments were conducted using ferric chloride which was carefully purified and free from oxide or hydroxide as the catalyst at varying temperatures above 300° C. and superatmospheric pressures in excess of 13 atmospheres according to the following general procedure. A Carius tube having a volume of about 30 milliliters was charged with the quantity of ferric chloride and phosgene indicated in Table I hereunder, sealed and placed in an iron pipe. This assembly of Carius tube and iron pipe was placed in a large muffle furnace for the specified heating period, heated to the temperature indicated in Table I and agitated by rotation along the long axis of the tube. Care was taken by means of special techniques to insure the accurate weighing of the charged materials.

Table I summarizes the reaction conditions and results obtained following the above procedure:

Table I

| Charge | | Temp. (° C.) | Pressure [1] (atmospheres) | Heating Time (hours) | Yield CCl₄ (Percent) |
|---|---|---|---|---|---|
| FeCl₃ (moles) | COCl₂ (moles) | | | | |
| 0.018 | 0.014 | 300 | 24 | 4 | 19 |
| 0.018 | 0.014 | 400 | 28 | 17 | 84 |
| 0.018 | 0.014 | 400 | 28 | 1 | 65 |
| 0.018 | 0.014 | 400 | 28 | 0.5 | 36 |
| 0.018 | 0.014 | 350 | 26 | 20 | 86 |
| 0.018 | 0.014 | 350 | 26 | 4 | 72 |
| 0.018 | 0.014 | 350 | 26 | 2 | 63 |
| 0.018 | 0.014 | 350 | 26 | 1 | 43 |
| 0.037 | 0.014 | 350 | 44 | 1 | 57 |
| 0.006 | 0.014 | 350 | 16 | 1 | 9 |
| 0.018 | 0.028 | 350 | 38 | 1 | 51 |
| 0.018 | 0.007 | 350 | 13 | 1 | 37 |

[1] Calculated basis the perfect gas law.

EXAMPLE II

Following the procedure and using the apparatus of Example I and employing carefully purified aluminum chloride as the catalyst, a series of experiments were performed whereby phosgene was disproportionated. Table II tabulates the experimental conditions and results:

Table II

| Charge | | Temp. (° C.) | Pressure (atmospheres) | Time (hours) | Yield CCl₄ (Percent) |
|---|---|---|---|---|---|
| AlCl₃ (moles) | COCl₂ (moles) | | | | |
| 0.007 | 0.014 | 500 | 44 | 17 | 63 |
| 0.007 | 0.014 | 500 | 44 | 2 | 42 (A) |
| 0.007 | 0.014 | 400 | 38 | 67 | 77 |
| 0.007 | 0.014 | 400 | 38 | 18 | 50 |
| 0.007 | 0.014 | 400 | 38 | 6 | 24 (A) |
| 0.007 | 0.028 | 400 | 64 | 6 | 43 |
| 0.007 | 0.028 | 400 | 64 | 2 | 18 (A) |
| 0.007 | 0.056 | 400 | 116 | 6 | 58 |
| 0.007 | 0.056 | 400 | 116 | 2 | 36 |
| 0.007 | 0.084 | 400 | 167 | 2 | 58 |
| 0.022 | 0.014 | 400 | 64 | 18 | 76 |
| 0.022 | 0.014 | 400 | 64 | 6 | 46 |
| 0.022 | 0.014 | 400 | 64 | 2 | 25 |
| 0.022 | 0.014 | 400 | 64 | 1 | 26 (A) |
| 0.022 | 0.056 | 400 | 144 | 2 | 81 |
| 0.022 | 0.056 | 400 | 144 | 1 | 55 (A) |
| 0.045 | 0.014 | 400 | 109 | 6 | 69 |
| 0.045 | 0.014 | 400 | 109 | 2 | 49 |
| 0.045 | 0.014 | 400 | 109 | 1 | 39 (A) |
| 0.007 | 0.014 | 300 | 33 | 89 | 18 |
| 0.007 | 0.112 | 300 | 186 | 17 | 26 |
| 0.022 | 0.014 | 300 | 56 | 17 | 38 (A) |
| 0.045 | 0.056 | 300 | 158 | 3 | 45 (A) |

(A) Denotes agitation of the Carius tube by rocking.

EXAMPLE III

A Carius tube of 30 milliliters' volume was charged with 0.014 mole of phosgene and 0.015 mole of bismuth chloride, heated to 500° C. under 29 atmospheres' pressure for one hour while agitating the contents by rocking the Carius tube. A total of 0.0009 mole of carbon tetrachloride was produced in this manner.

The following examples indicate the importance of pressure in excess of 10 atmospheres and use of a catalyst:

EXAMPLE IV

Duplicating the procedure of Example I, 0.007 mole of aluminum chloride and 0.014 mole of phosgene were charged to a Carius tube of 300 milliliters' volume and heated to 400° C. for 64 hours at 3.8 atmospheres' pressure. No carbon tetrachloride was formed.

EXAMPLE V

Duplicating the procedure of Example I, 0.014 mole of phosgene were charged to the Carius tube which was then heated to 500° C. for 65 hours at 29 atmospheres' pressure. No carbon tetrachloride was formed.

Aluminum chloride and ferric chloride comprise the preferred Friedel-Crafts chloride catalysts. Aluminum chloride is especially valuable among other reasons because it catalyzes phosgene formation by reaction of carbon monoxide and elemental chlorine and hence serves both for phosgene formation and phosgene disproportionation. Bismuth chloride, although not as effective as the preferred aluminum chloride or ferric chloride catalysts, is useful as shown in Example III. Other Friedel-Crafts chloride catalysts include tin chlorides, zinc chloride and titanium tetrachloride.

Phosgene disproportionation is usually accomplished in the vapor phase. Under most of the contemplated temperature and pressures, both the phosgene and catalyst are vapors. However, the disproportionation may occur in the presence of a liquid phase, as when the reaction temperature and pressure is such that a catalyst such as aluminum chloride is liquid.

According to a further embodiment of this invention, it has been found especially advantageous to restrict the degree of phosgene disproportionation to from 25 to 50 percent, e.g. to convert between 25 and 50 percent of the phosgene. This may be accomplished by limiting the time the phosgene is subjected to conditions under which disproportionation occurs. It has been determined that the rate of disproportionation decreases as the degree of disproportionation increases. Hence, at the outset, the rate of carbon tetrachloride formation is at a maximum and, as the disproportionation continues, there is a continuing decline in this rate. In a preferred practice, a cyclic process is conducted by recycling unreacted phosgene and catalyst while intentionally limiting the degree of disproportionation.

As a consequence, a reaction mixture of phosgene, carbon dioxide and carbon tetrachloride along with Friedel-Crafts chloride catalyst is obtained. Fractional distillation under superatmospheric pressures is a useful means of accomplishing separation of carbon tetrachloride. Aluminum chloride and unreacted phosgene separated in this way or by other means is recoverable and may be used in further disproportionation reactions. They may be recycled to the reactor, admixed with additional phosgene and catalyst (when required) to partake in a subsequent phosgene disproportionation.

While the present invention has been described with reference to specific details of certain embodiments, it is not intended that the invention be construed as limited thereto except insofar as such details are included in the appended claims.

What is claimed:

1. A method which comprises heating phosgene to at least 200° C. under a superatmospheric pressure of at least 10 atmospheres in the presence of a Friedel-Crafts chloride catalyst whereby to disproportionate the phosgene and produce carbon tetrachloride.

2. A method which comprises heating of phosgene to from 200° C. to 600° C. under 10 to 2500 atmospheres' pressure in the presence of a Friedel-Crafts chloride catalyst whereby to disproportionate phosgene and produce carbon tetrachloride.

3. The method of claim 1 wherein the catalyst is ferric chloride.

4. The method of claim 1 wherein the catalyst is aluminum chloride.

5. A method which comprises heating a mixture of phosgene and a Friedel-Crafts chloride catalyst containing 0.1 to 5.0 moles of catalyst per mole of phosgene to above 200° C. under superatmospheric pressure in excess of 10 atmospheres for at least one hour whereby to disproportionate the phosgene and obtain carbon tetrachloride.

6. The method of claim 5 wherein the catalyst is ferric chloride.

7. The method of claim 5 wherein the catalyst is aluminum chloride.

8. The method of claim 5 wherein the catalyst is bismuth trichloride.

9. A method which comprises heating a mixture of phosgene and a Friedel-Crafts chloride catalyst containing 0.1 to 5.0 moles of catalyst per mole of phosgene to above 200° C. under superatmospheric pressure in excess of 10 atmospheres whereby to disproportionate phosgene and form carbon tetrachloride, and limiting the degree of phosgene disproportionation to 25 to 50 percent.

References Cited in the file of this patent

Stock et al.: Zieschrift Anorg. Chemie, vol. 147, pages 245–255 (1925).